(12) United States Patent
Schrager (10) Patent No.: US 8,620,389 B2
(45) Date of Patent: *Dec. 31, 2013

(54) VOICE CONTROL OF MULTIMEDIA AND COMMUNICATIONS DEVICES

(75) Inventor: Martin Schrager, Boca Raton, FL (US)

(73) Assignee: Avon Associates, Inc., Boca Raton, FL (US)

( * ) Notice: Subject to any disclaimer, the term of this patent is extended or adjusted under 35 U.S.C. 154(b) by 72 days.

This patent is subject to a terminal disclaimer.

(21) Appl. No.: 13/297,844

(22) Filed: Nov. 16, 2011

(65) Prior Publication Data

US 2012/0065971 A1 Mar. 15, 2012

Related U.S. Application Data

(63) Continuation of application No. 11/279,836, filed on Apr. 14, 2006, now Pat. No. 8,068,881, which is a continuation-in-part of application No. 10/215,872, filed on Aug. 9, 2002, now Pat. No. 7,072,686.

(51) Int. Cl.
*H04M 1/00* (2006.01)

(52) U.S. Cl.
USPC ...... 455/569.1; 455/41.1; 455/41.2; 455/419; 379/88.01

(58) Field of Classification Search
USPC ......... 455/41.2, 41.3, 70, 132, 380, 389, 419, 455/420, 563, 569.1; 379/88.01–88.04
See application file for complete search history.

(56) References Cited

U.S. PATENT DOCUMENTS 5,802,467 A * 9/1998 Salazar et al. ................ 455/420
2002/0064370 A1 * 5/2002 Berkheimer et al. ........... 386/52

* cited by examiner

*Primary Examiner* — Phuoc Doan
(74) *Attorney, Agent, or Firm* — Novak Druce Connolly Bove + Quigg LLP (57) ABSTRACT

A method for operating a communications device can include receiving a plurality of spoken commands uttered by a user, the plurality of spoken commands comprising a custom written communication message to be displayed. The method can also include executing a speech recognition engine to recognize and convert each of the spoken commands into corresponding electronic signals that selectively enable and operatively control each of a plurality of multimedia units and at least one light array, wherein the electronic signals are configured to cause multiple light units of the light array to be selectively activated and display the custom written communication message. The method can further include transmitting audio signals received from different ones of the plurality of multimedia units to a radio via a preset open radio channel for broadcasting the audio signals through at least one speaker connected to the radio.

20 Claims, 7 Drawing Sheets

VOICE CONTROL OF MULTIMEDIA AND COMMUNICATIONS DEVICES

CROSS-REFERENCE TO RELATED APPLICATION

This application is a Continuation of U.S. patent application Ser. No. 11/279,836, filed Apr. 14, 2006, which is a continuation-in-part of U.S. patent application Ser. No. 10/215,872, filed Aug. 9, 2002 and now issued U.S. Pat. No. 7,072,686

FIELD OF THE INVENTION

The present invention relates the field of portable communications devices.

BACKGROUND

As consumers continue to demand mobile access to many computing and communications services, technology continues to evolve to accommodate consumer demand. Ideally, consumers prefer to have access to most, if not all, of the same computing functions presently available at home or the office despite being away from such resources. In response to consumer demand, a wide variety of portable electronic devices have become commercially available. For example, individuals can track and store a variety of personal information using conventional personal digital assistants, communicate with friends, family, and business contacts using cellular telephones, and listen to music through portable radios, compact disc (CD) players, and/or Motion Picture Experts Group-1 Audio Layer 3 (MP3) players. A variety of other portable devices such as portable short distance radios and global positioning system (GPS) receivers are available to consumers as well.

The majority of commercially available portable devices are sold as single function units. That is, the consumer typically must purchase a music player separately from a cellular telephone, or a citizen band radio separately from a GPS receiver. Typically, consumers must carry a plethora of electronic devices should the consumer wish to travel with calendaring, music, communications, and the like. Even in cases where one or more of these devices are available in various combinations within a single unit, frequently, no single combination device is able to meet the consumer's full range of needs.

Although each device may not be burdensome to operate alone, when used in combination with one or more other devices, the consumer can be overwhelmed with connections, wires, cables, and attachments. To better organize the various electronic devices a consumer may carry, several varieties of carry-alls or electronic device organizers are available. Still, as the benefit of using a portable electronic device is the immediacy and ease with which the different functions of the device can be accessed, storing the device in a carry-all may not prove to be convenient. For example, by the time a consumer is able to locate a ringing cellular telephone within a carry-all, the call may be missed. By the time one finds a personal digital assistant within a carry-all, the opportunity to use the sought after information may have passed.

Assuming that a consumer is able to carry each of the various portable electronic devices that the consumer needs or desires, the consumer still must have one or more hands free in order to operate any given device. With respect to travelers, however, this is not often the case. More than likely, travelers use one or both hands to carry luggage, a carry-on bag, or possibly a personal digital assistant. To operate any of the traveler's portable electronic devices, the traveler may have to stop, put down one or more bags, search for the device, and only then proceed to use the desired device.

Other users, for example individuals who enjoy walking, jogging, hiking, bicycling, motorcycling, boating, or other activities, also rely upon portable electronic devices such as GPS units, music players, cellular telephones, voice memo pads, and the like when engaged in sports or other outdoor activities. Such individuals, however, not only must have one or more free hands to operate a given device, but also must be able to divert their attention away from an ongoing activity to operate the device. For example, the user typically must watch a dial or display as a radio is tuned, as a volume is adjusted, and the like. The use of ones eyes and hands, however, can cause a break in rhythm and concentration and may even cause an accident.

SUMMARY OF THE INVENTION

The present invention provides a solution for persons requiring access to a variety of multimedia, communications, and computing functions from a single electronic device. In particular, the present invention provides a portable electronic device which can include one or more of an AM/FM radio, a music player, a short distance radio, a voice memo pad, a cellular telephone, a global positioning system (GPS) receiver, an AM/FM radio interface, and a transponder (hereafter collectively referred to as "multimedia units"). Importantly, each of the various multimedia units not only can be included within a single, portable device, but also can be operated in a hands-free manner through the use of voice commands and speech recognition technology. Although the device can be embodied in a variety of forms, according to one inventive arrangement, the device can be modular, wearable, and weather resistant.

One aspect of the present invention can include a portable multimedia and communications device. The device can include a transducive element for receiving sound. According to one arrangement, the transducive element can be disposed in a first headset unit which can include a sound generation source and a short range wireless transceiver. The device also can include a base unit having a plurality of multimedia units and a processor executing a speech recognition engine for recognizing user speech. Notably, the speech recognition engine can be switched between a speaker-independent operational mode and a speaker-dependent operational mode responsive to a control signal, for example a user spoken utterance.

The device can be voice enabled such that each of the multimedia units can be selectively enabled and operated responsive to user voice commands received via the transducive element and communicated to the base unit via a communication link. Notably, the base unit can include a second short range wireless transceiver for communicating with the short range wireless transceiver of the headset unit. Accordingly, the communication link can be a wireless communication link. Still, the transducive element, or the headset unit depending upon the particular embodiment of the present invention, can be connected to the base unit via a wired connection.

According to one aspect of the present invention, responsive to activating one of the plurality of multimedia units, the processor can disable another active one of the plurality of multimedia units by lowering an audio volume of the other active multimedia unit or pausing operation of the other active multimedia unit. Responsive to terminating use of the activated multimedia unit, the processor can re-enable the other active one of the plurality of multimedia units.

For example, one of the multimedia units can be a wireless telephone. Thus, responsive to the wireless telephone receiving a telephone call, the processor can disable an active one of the multimedia units. For instance, the processor can disable an active multimedia unit by lowering an audio volume of the active multimedia unit or by pausing operation of the active multimedia unit. Responsive to termination of the telephone call, the processor can re-enable the active multimedia unit.

Taking another example, a second one of the multimedia units can be a short distance radio. In that case, responsive to the short distance radio receiving a wireless communication, the processor can disable an active one of the multimedia units. The processor can disable an active multimedia unit by lowering an audio volume of the active multimedia unit or by pausing operation of the active multimedia unit. Responsive to termination of the wireless communication, the processor can re-enable the active multimedia unit.

Still, the present invention can include additional multimedia units. For example, the present invention can include, but is not limited to, multimedia units such as a GPS receiver, an AM/FM radio tuner, an audio player, a compact disc player, a digital software-based media player, a cassette player, a voice recorder memo pad, an AM/FM radio interface, and a transponder.

Another embodiment of the present invention can include at least a second headset unit configured similarly to the first headset unit. The first headset unit and the second headset unit can communicate with one another through the base unit via wireless communication links.

Another aspect of the present invention can include a method of operating a voice activated, portable multimedia and communications device. The method can include receiving a user spoken utterance in a transducive element. The transducive element can be included within a headset unit. The user spoken utterance can be transmitted to a base unit via a wired connection or a short distance wireless communication link. The user spoken utterance can be speech recognized as a valid voice command. Accordingly, one of the multimedia units disposed in the base unit can be selectively enabled responsive to identifying the user spoken utterance as a valid voice command. Notably, the method can include switching between a speaker-independent operational mode and a speaker-dependent operational mode responsive to a control signal such as a voice command.

The method can include activating one of the plurality of multimedia units, and responsive to the activating step, disabling another active one of the plurality of multimedia units. For example, the disabling step can include lowering an audio volume of the other active multimedia unit or pausing operation of the other active multimedia unit. Responsive to terminating use of the activated one of the plurality of multimedia units, the other active one of the plurality of multimedia units can be re-enabled.

According to one embodiment of the present invention, the voice command can activate an intercom operational mode. In that case, the method can include receiving a subsequent user spoken utterance in the base unit from the headset unit via a wireless communication link. The user spoken utterance can be forwarded to a second headset unit via a second wireless communication link.

Still, one of the multimedia units can be a wireless telephone. Accordingly, the method can include receiving a telephone call in the wireless telephone and playing an audio notification through the headset unit indicating that the call has been received. For example, the audio notification can play a name associated with the received telephone call or a calling telephone number of the received call. Notably, the audio notification can query the user whether to answer the received telephone call. If another one of the multimedia units is active when the telephone call is received, the method further can include, responsive to receiving the telephone call, disabling the active multimedia unit. The active multimedia unit can be disabled by lowering an audio volume of the active multimedia unit or by pausing operation of the active multimedia unit. Responsive to terminating the telephone call, the active multimedia unit can be re-enabled. The method also can include determining that a calling number for the received telephone call is not included in a contact list and querying a user whether to save the received call information.

According to another embodiment of the present invention, one of the multimedia units can be a short distance radio. In that case the method can include receiving a short distance radio communication in the short distance radio and providing an audio notification to the headset unit indicating that the short distance radio communication has been received. For example, the user can be queried as to whether the received short distance radio communication should be answered. If another one of the multimedia units is active when the short distance radio communication is received, the method also can include, responsive to receiving the short distance radio communication, disabling the active multimedia unit. For example, the active multimedia unit can be disabled by lowering an audio volume of the active multimedia unit or by pausing operation of the active multimedia unit. Responsive to terminating the short distance radio communication, the active multimedia unit can be re-enabled. Notably, if one of the plurality of multimedia units is a wireless telephone and another one of the plurality of multimedia units is a short distance radio, the method can include exchanging audio between the wireless telephone and the short distance radio.

BRIEF DESCRIPTION OF THE DRAWINGS

There are shown in the drawings embodiments which are presently preferred, it being understood, however, that the invention is not limited to the precise arrangements and instrumentalities shown.

DESCRIPTION OF THE INVENTION

The present invention provides a solution for persons requiring hands-free control over a variety of multimedia, communications, and computing functions contained within a single electronic device. In particular, the present invention provides a portable electronic device which can include one or more of an AM/FM radio, a music player, a short distance radio, a voice memo pad, a cellular telephone, a global positioning system (GPS) receiver, an AM/FM radio interface, and a transponder (hereafter collectively referred to as "multimedia units"). Importantly, each of the various multimedia units can be operated in a hands-free manner through the use of voice commands. Although the device can be embodied in a variety of forms, according to one inventive arrangement, the device can be modular, wearable, and weather resistant.

Figure 1:
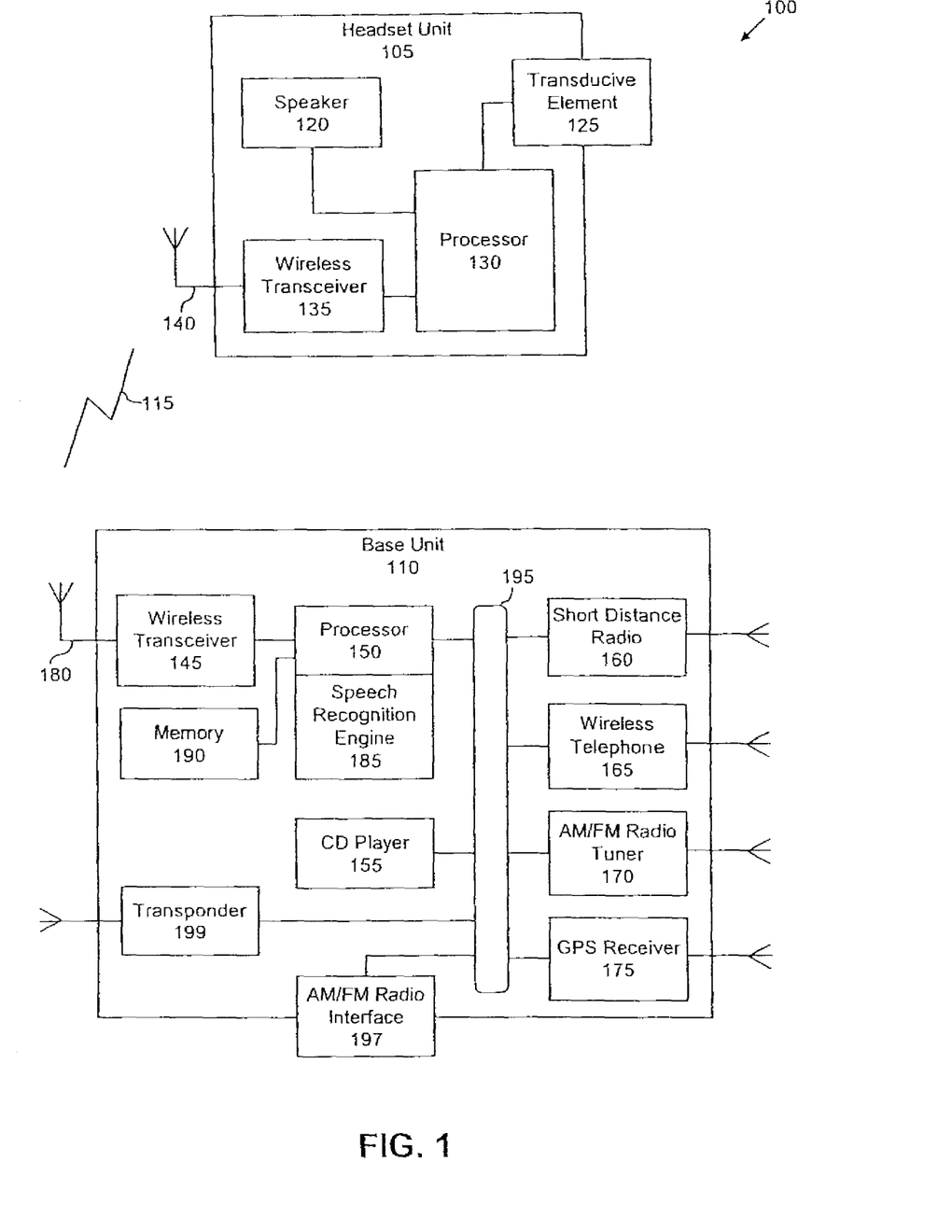
FIG. 1 is a schematic diagram illustrating a voice-controlled multimedia and communications device in accordance with the inventive arrangements disclosed herein.

FIG. 1 is a schematic diagram illustrating a voice-controlled multimedia and communications device (VCMCD) 100 in accordance with the inventive arrangements disclosed herein. As shown, the VCMCD 100 can include two primary components, a headset unit 105 and a base unit 110. The headset unit 105 and the base unit 110 can communicate with one another via a wireless communication link 115. The headset unit 105 can include a speaker 120 or other sound generator, a transducive element 125, a processor 130, a wireless transceiver 135, and an antenna 140. The speaker 120 can be disposed in an earpiece portion of the headset unit 105 to provide audio output when the headset 105 is worn by a user. Although not shown in FIG. 1, the headset unit 105 can include additional speakers so as to provide stereo sound. Accordingly, the headset can include two earpiece portions, each having a speaker disposed therein.

The transducive element 125, for example a microphone, can be attached to the headset unit 105. For example, according to one embodiment of the present invention, the transducive element 125 can be located on an arm which is rotatably attached to the earpiece so as to swing up and away from a user's face when not in use. Still, the transducive element 125 can be attached to the headset in any of a variety of different forms. For instance, the transducive element can be disposed within a clip-on apparatus which can clip onto a user's clothing. In that case, the transducive element 125 can be communicatively linked to the headset unit 105 via a wired connection. In the event the transducive element 125 is located as a separate component from the headset unit 105, the transducive element 125 can be communicatively linked to the base unit 110 via a wireless or wired connection.

Continuing with FIG. 1, the speaker 120 and the transducive element 125 can be communicatively linked to the processor 130. The processor 130 can perform a variety of audio processing and routing functions, as well as serve as an interface between the speaker 120, the transducive element 125, and the wireless transceiver 135. In particular, the processor 130 can perform analog-to-digital (A/D) conversions of audio signals received from the transducive element 125 and perform digital-to-analog (D/A) conversions of audio so as to provide a suitable audio signal to the speaker 120.

As mentioned, the processor 130 further can route signals among the various components of the headset unit 105. In particular, the processor 130 can receive audio signals, control signals, and other data originating from the base unit 110 through the wireless transceiver 135. The processor 130 can separate audio signals from the various control signals, D/A convert the audio, and provide the audio to the speaker 120. Similarly, the processor 130 can A/D convert audio signals received from the transducive element 125, and provide the converted audio in addition to any control signals and data to the wireless transceiver 135 for transmission to the base unit 110.

It should be appreciated that the processor 130, although depicted as a single general purpose processor, can be embodied as one or more processors, including control processors and audio processors such as digital signal processing (DSP) units. The speaker 120 and the transducive element 125 can be communicatively linked to the processor 130 via suitable circuitry. The processor 130 and the wireless transceiver 135 also can be communicatively linked via circuitry, for example a communications bus capable of supporting two way communications.

The wireless transceiver 135 can serve as an interface to the base unit 110. Specifically, the wireless transceiver 135 can receive signals from the processor 130 and convert the signals for use with a suitable wireless communications protocol for transmission. Similarly, the wireless transceiver 135 can receive signals from the base unit 110 and decode the signals using an appropriate wireless communications protocol prior to forwarding the signals to the processor 130.

The wireless transceiver 135 can be embodied in a variety of forms. For example, the wireless transceiver 135 can be configured to communicate with the base unit 110 using sound waves or infrared light. According to one embodiment of the invention, however, radio waves, that is radio frequency (RF) communication can be used. Thus, the wireless transceiver 135 can provide a signal to antenna 140 for transmission to the base unit 110. The wireless transceiver 135 can be configured to communicate with the base unit 110 using any of a variety of short range wireless technologies and/or protocols. For example, the wireless transceiver 135 can utilize BLUETOOTH technology, another technology of the 802.11 family of wireless communication specifications, as well as other proprietary technologies.

It should be appreciated, however, that the audio signal received from the transducive element 125 can be provided to the wireless transceiver 135 and transmitted in analog form. Accordingly, after the audio signal is received by the base unit 110, the processor 150, to be described in greater detail, can A/D convert the signal. In such an embodiment, audio and control signals transmitted from the base unit 110 to the headset unit 105 can be transmitted in analog form as well. In that case, the headset 105 can include additional analog processing circuitry, including analog audio processing circuitry.

According to another embodiment of the present invention, the speaker 120, the transducive element 125, and the processor 130 can be communicatively linked to the base unit 110 (to be described herein in greater detail) via a suitable wired connection which can facilitate two way communications among the headset unit 105 and the base unit 110.

On the exterior of the headset unit 105, one or more control buttons and/or switches can be included. The controls can be hardwired to perform one or more predetermined functions, or can be programmed through the base unit 110 to perform one or more of a variety of different functions. Alternatively, a software application executing on another computer system can be used to configure the VCMCD 100 using a charging cradle or other data link which communicatively links the headset unit 105, the base unit 110, and the separate computer system. Regardless, the controls can be assigned to perform functions such as interrupting the processor 130 so as to give precedence to audio input received from the transducive element 125, dialing 911, sending an emergency signal over the short distance radio, sending a transponder signal, or awakening the VCMCD 100 from a power save or sleep mode. For example, activating a control can notify the VCMCD 100 that speech to follow specifies a name for voice dialing or is to be recorded as a voice memo. Still, one or more controls, whether permanently configured or software configurable, can be included for accessing any of the various functions to be described herein with reference to the base unit 110. For example, one or more control buttons can be dynamically assigned a function according to the operating state of the VCMCD 100.

The base unit 110 of the VCMCD 100 can include a wireless transceiver 145, a processor 150, a compact disc (CD) player 155 or other music source, a short distance radio 160, a wireless telephone 165, an AM/FM radio tuner 170, a GPS receiver 175, an AM/FM radio interface, as well as a transponder 199. The wireless transceiver 145 can be matched to the wireless transceiver 135 of the headset unit 105 so as to support two-way wireless communications via antenna 180 as previously discussed. The transceiver 145 can be communicatively linked to the processor 150 via suitable interface circuitry. Thus, the transceiver 140 can receive data from the processor 150, format data using the appropriate communications protocol, and send data to the headset unit 105 via the wireless communication link 115. Similarly, data received from the headset unit 105 over the wireless communication link 115 can be decoded and provided to the processor 150.

The processor 150 can be communicatively linked to the CD player 155, the short distance radio 160, the wireless telephone 165, the AM/FM radio tuner 170, the GPS receiver 175, the AM/FM radio interface 197, and the transponder 199 via suitable circuitry such as a communications bus 195. The communications bus 195 can support two way communication among each of the respective components, thereby enabling the exchange of control signals as well audio data.

The processor 150, similar to the processor 130 of the headset unit 105, can include one or more general purpose processors and/or DSP units. The processor 150, however, can include a speech recognition engine 185. For example, the speech recognition engine 185 can be included in the memory of processor 150 or can be included within an additional memory 190 which is accessible by the processor 150. In any case, the speech recognition engine 185 can receive digitized speech from the headset unit 105 and convert the received speech to text. The speech recognized text can be processed to determine one or more voice commands which can be executed by the processor 150.

Still, as discussed, the based unit 110 can receive analog signals from the headset unit 105 which can be decoded by the wireless transceiver 145. In that case, the analog signals can be A/D converted by the processor 150 for further processing such as speech recognition.

The CD player 155 can be communicatively linked to the processor 150 via the communications bus 195. Notably, additional audio sources such as tape players and other digital medial players including, but not limited to, minidisk players, Motion Picture Experts Group-1 Audio Layer 3 (MP3) players, and the like can be included in place of, or in addition to, the CD player 155. According to one embodiment of the present invention, one or more software-based audio players can be included within the base unit 110.

The short distance radio 160 can be any of a variety of personal two-way short distance radio communications devices which can operate over distances of less than one mile and up to distances of tens of miles. For example, the short distance radio 160 can be configured to operate over one of the Citizen's Band Radio Services, such as Citizen's Band (CB) or Family Radio Service (FRS). Alternatively, the short distance radio 160 can be configured to operate over General Mobile Radio Service (GMRS), or some other short distance radio communications format.

The wireless telephone 165, for example a cellular telephone, the AM/FM radio tuner 170, and the GPS receiver 175 are commercially available components. Notably, the AM/FM radio tuner 170 can be programmed with one or more preset stations for both AM and FM bands. Each of the various preset stations can be accessed via a suitable voice command such as "preset 1", "preset 2", "next preset up", or "next preset down". Each of the respective components can be communicatively linked to the processor 150 via the communications bus 195. The transponder 199 can provide wireless communications for monitoring incoming signals or sending outgoing signals such as a "beacon" signal which can be tracked by third parties for purposes of safety. Although the transponder 199 can include active components so that the transponder can receive and send signals which can be detected over long ranges, the transponder 199 also can include passive components enabling the transponder 199 to be detected by sensors within ranges of several feet. Notably, the transponder 199 can be configured to transmit coordinates as determined by the GPS receiver 175 in cases of emergency or periodically depending upon the VCMCD 100 configuration.

The AM/FM radio interface 197 allows the base unit 110 to be connected to a car radio, for example, via an antenna input or other standard connector available on conventional car radios. Responsive to connecting the base unit 110 to a car radio via the AM/FM radio interface 197, the processor 150 can direct audio output through the communications bus 195 to the AM/FM radio interface 197. The AM/FM radio interface 198 enables a user to listen to audio received and generated by the VCMCD 100 through a high quality car audio system rather than the headset unit 105.

According to another embodiment of the present invention, the headset unit 105 can be configured, or a separate and additional transducive element can be configured, without the speaker 120. As the audio originating from the base unit 110 can be played through the car audio system when the AM/FM radio interface 197 is engaged, no speaker need be included in the headset unit 105. For example, a wearable microphone such as a lapel microphone can be used. Such a microphone can be wirelessly connected to the base unit 110 as described. Alternatively, the microphone can be connected to the base unit 110 via a wired connection to a suitable audio jack disposed in the base unit 110 which can be connected to the processor 150 via suitable interface circuitry.

The processor 150 can receive speech recognized text from the speech recognition engine 185 to compare against a grammar or vocabulary of recognizable words and/or voice commands. If a match exists, the processor 150 can determine an appropriate action. In particular, responsive to voice commands, the processor 150 can selectively enable and disable the CD player 155 or other audio source, the short distance radio 160, the wireless telephone 165, the AM/FM radio tuner 170, and the GPS receiver 175. Moreover, the processor 150 can control software driven processes such as recording voice memos and the like responsive to voice commands. Notably, not only can a user select a particular device through voice commands, but the user also can access the various operational parameters of each of the respective devices via voice commands. An exemplary listing of voice commands is included in the Appendix.

As shown in FIG. 1, the short distance radio 160, the wireless telephone 165, the AM/FM radio tuner 170, the GPS receiver 175, and the transponder 199 each can be configured to include a separate antenna for sending and receiving wireless signals. It should be appreciated by those skilled in the art, however, that one or more of these components can be configured to share a common antenna. For example, the wireless telephone 165 can be configured to share a general purpose antenna with the short distance radio 160, or with the wireless transceiver 145. Regardless of the particular antenna configuration used, the examples disclosed herein are not intended as a limitation of the present invention.

A power source (not shown) can be included in the headset unit 105 and the base unit 110. The power source can be one or more disposable batteries or rechargeable batteries. For example, a rechargeable power source can be recharged in a charging cradle similar to the cradle commonly used with conventional personal digital assistants. Notably, both the headset 105 and the base unit 110 can be configured to charge within such as cradle. Still, other charging mechanisms can be used to charge the power source of the VCMCD 100 such as wearable, flexible photovoltaic devices, regenerative braking charging units, or chargers which connect to an electrical connection such as a cigarette lighter receptacle commonly used in motor vehicles. Accordingly, the base unit 110 can draw power to operate as well as recharge a rechargeable power source via such an electrical connection.

Figure 2:
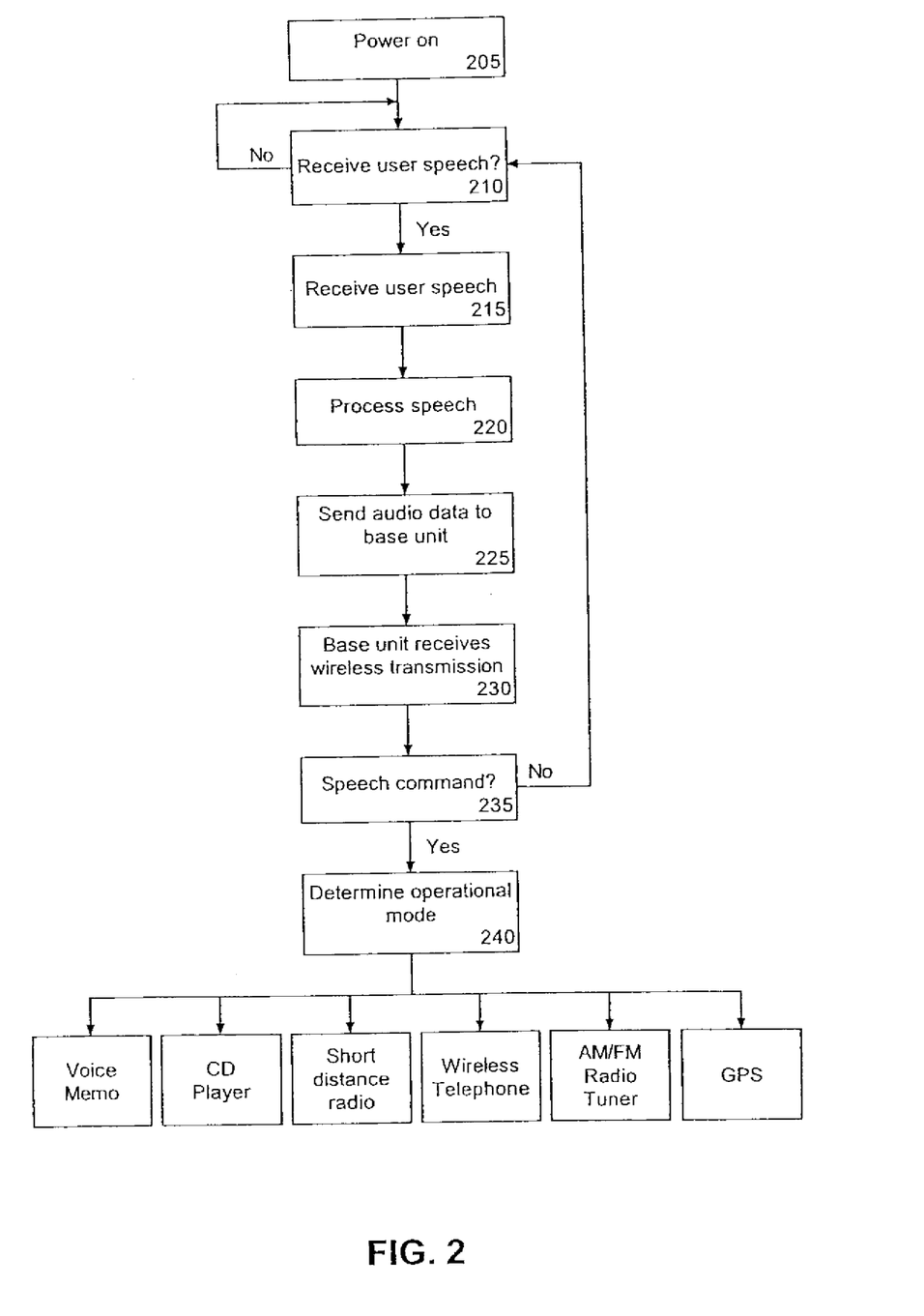
FIG. 2 is a flow chart illustrating a method of communicating between the headset unit and the base unit of the voice-controlled multimedia and communications device of FIG. 1.

FIG. 2 is a flow chart illustrating a method 200 of communicating between the headset unit and the base unit of FIG. 1. In step 205, the VCMCD can be powered on. The VCMCD can include a power switch on the headset unit as well as the base unit. Accordingly, the headset unit and the base unit can be powered on independently of one another. In an alternative embodiment of the invention, the VCMCD can be powered on by a voice command. For example, the unit can remain in a low power consumption sleep mode such that a received voice command such as "power on" can activate or awaken the VCMCD.

In any case, once the VCMCD is powered on, the VCMCD can be configured to begin operation in either a speaker independent mode or a speaker dependent mode. In speaker independent mode, a generalized speaker model can be used for purposes of speech recognition. That is, the speaker model is not tailored for use with any particular user. In speaker dependent mode, a speaker-specific voice model can be used which emphasizes perceptually important speaker characteristics. Although the VCMCD can determine a speaker dependent model, the speaker dependent model also can be derived from a counterpart application and transferred to the base unit via a data link. The VCMCD can be configured to power on in either speaker independent or speaker dependent mode through various controls on the base unit, or using a software application configured to communicate with the VCMCD via a charging cradle, a universal serial bus port, or other wired or wireless connection.

In step 210, the VCMCD can enter a power save mode awaiting user speech. If user speech is received, the method can continue to step 215. If not, however, the method can continue to loop until user speech is received. If user speech is received, the method can continue to step 220. According to one embodiment of the invention, the processor can implement one or more noise filters and frequency filters so as to emphasize sounds within the frequency range of human speech. Thus, if a signal is received having a particular strength and within a particular frequency range, the signal can be considered a speech signal. Notably, the transducive element can be suited for use with the frequency range of human speech as well as be equipped with a wind guard. Accordingly, user speech can be detected automatically and distinguished from background and environmental noise.

In an alternative embodiment of the invention, either the headset unit, the base unit, or both can be equipped with a control which awakens the VCMCD or serves as an indication that the user will speak. The user can activate such a control prior to speaking. In any event, user speech can be received through the transducive element and converted to an analog audio signal to be provided to the headset processor.

Continuing with step 220, the analog speech signal can be processed for transmission to the base unit. In particular, the analog speech signal can be A/D converted by the headset processor and provided to the headset transceiver. The headset transceiver 220 can prepare the digitized speech signal according to a wireless communication protocol for transmission to the base unit. Accordingly, in step 225, the headset unit can transmit the speech signal to the base unit through the wireless communication link.

In step 230, the base unit can receive the audio data from the headset via the wireless communication link and the base unit wireless transceiver. The base unit wireless transceiver can decode the signal and provide the digitized audio signal to the base unit processor. In step 235, the processor can perform speech recognition on the received audio and determine whether the received audio is a valid voice command. In particular, the speech recognition engine can compare the recognized text to one or more possible commands specified in a command grammar or list. If the speech is not a valid command, the method can continue to step 210 and repeat as necessary. If the speech is a valid command, the method can continue to step 240 to determine the operating state corresponding to the received voice command.

In particular, the user can select any of a variety of operating modes including, but not limited to a voice memo mode, a CD player mode, a short distance radio mode, a wireless telephone mode, an AM/FM tuner mode, and a GPS mode. Each of the various operating modes can be associated with a predefined command vocabulary. Exemplary voice commands for each of the modes are illustrated in the Appendix. For example, the user can utter "radio on", "CD on", "communicator on", "memo on", or "locator on", and once received, the VCMCD will enter the appropriate operating state. Accordingly, if the command "CD on" is received, the command grammar associated with operation of the CD player can be activated. The command grammar for the CD player can include commands for skipping tracks, fast forwarding, rewinding, playing, pausing, stopping, as well as voice commands for various modes of continuous and random play.

It should be appreciated, however, that particular commands, for example volume commands, operating state commands, and power commands, can remain active no matter which state the VCMCD is operating. This enables a user to change operating states during operation of any of the multimedia units disclosed herein. For example, while dictating a voice memo, the user can say "phone", which can be a reserved voice command which initiates the wireless telephone mode. Accordingly, once the VCMCD enters the wireless telephone mode, the user can access voice dialing or other telephone related functions using voice commands.

Other voice commands which can remain in the active vocabulary can include specialized communications functions. For example, emergency or "911" access can be accessible no matter which mode the VCMCD is operating. Thus, the user can say "emergency 911" which can cause the VCMCD to initiate a cellular telephone call to 911 or another predetermined number, for example one corresponding to an emergency service. Voice dialing can remain active at all times such that the user can say "voice dial" and a contact name no matter which mode the VCMCD is operating. Notably, the VCMCD can be configured to transmit coordinates with an emergency call. Similar functionality can be available using the short distance radio and transponder. For example, responsive to a voice command such as "emergency communication", the VCMCD can transmit a call for help over one or more specified channels or continuously over one or more specified channels using the short distance radio. The user's coordinates as determined by the GPS receiver also can be transmitted through the short distance radio. Notably, the user's location can be specified either by sending data or by playing a text-to-speech rendition of the GPS receiver determined coordinates.

Figure 3:
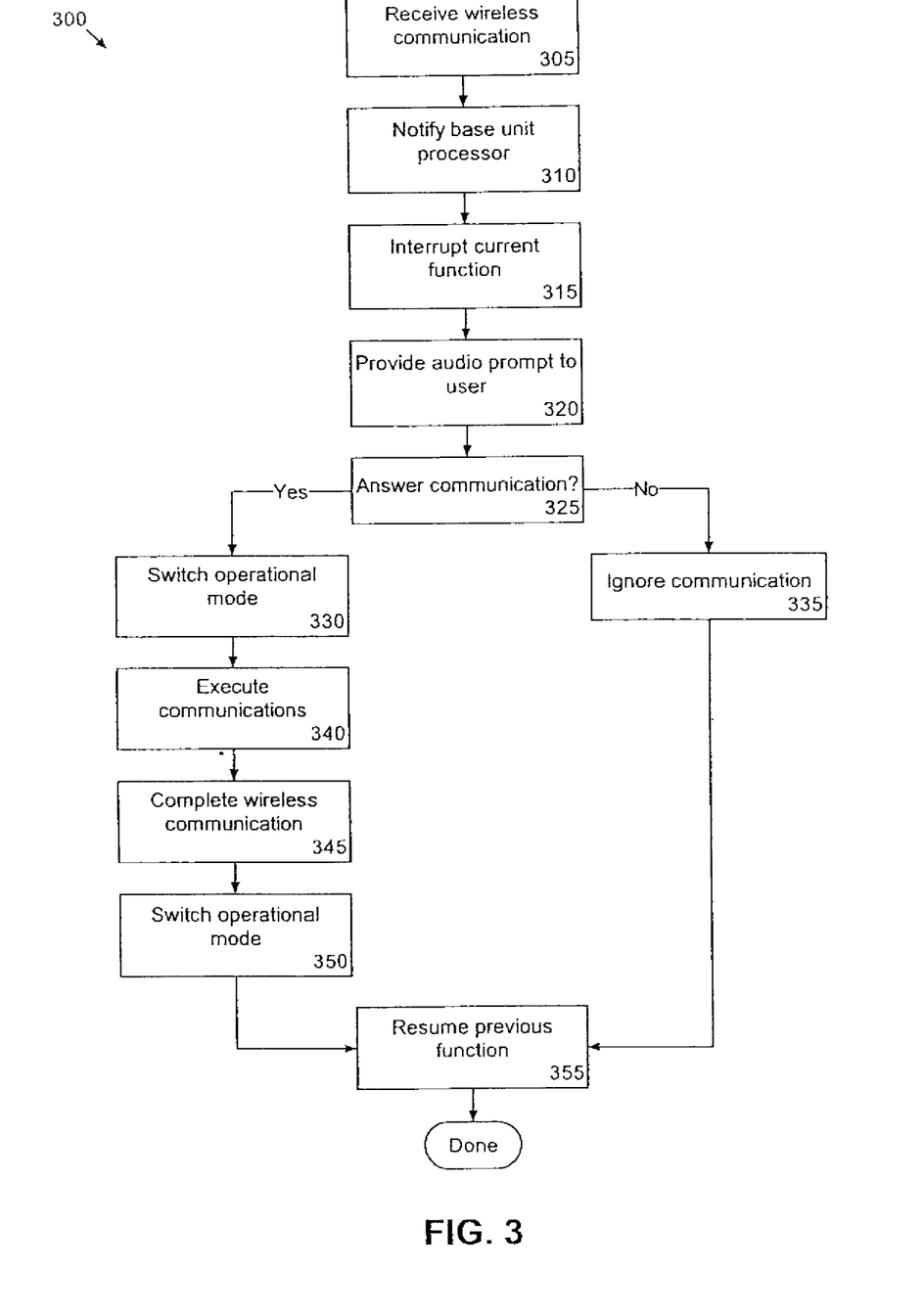
FIG. 3 is a flow chart illustrating a method of receiving and processing wireless communications in accordance with the present invention.

FIG. 3 is a flow chart illustrating a method 300 of receiving wireless communications in accordance with the present invention. The method can begin in a state wherein the user is engaged in an activity such as listening to a CD or audio file played by the audio source in the base unit or is dictating a voice memo. Accordingly, in step 305, a wireless communication can be received. For example, a telephone call can be detected by the wireless telephone in the base unit or an incoming communication can be received by the short distance radio in the base unit. Accordingly, in step 310, the particular multimedia unit having received the incoming wireless communication can send a notification to the base unit processor.

In step 315, the processor can instruct the current function to pause or otherwise stop. For example, the processor can pause the recording of a voice memo, stop the audio feed from the CD player or AM/FM radio tuner, or lower the volume of the multimedia unit currently playing. Similarly, if a telephone call is received during a short distance radio communication, or a short distance radio communication is received during an ongoing telephone call, the audio of the current active function can be lowered so that an audio prompt provided by the VCMCD can be heard by the user.

In step 320, the base unit processor can cause an audio notification to be played to the user. For example, a tone can be played from a tone generator (not shown) to indicate that an incoming communication has been received. Distinctive tones can be used to signify whether the received communication is a short distance radio communication or a received wireless telephone call. Alternatively, the processor can simply play an audio prompt which explicitly states that a telephone call or a short distance radio communication has been received. For example, a recorded voice prompt can be played or text-to-speech (TTS) technology can be used to play prompts to the user. Still, the base unit processor can send a control signal to the processor of the headset to play an audio prompt stored in the headset unit.

According to one embodiment of the invention, the audio prompt can inform the user of the identity of the calling party. For example, the calling number can be played to the user. Additionally, if the calling number, or source identifier in the case of a short distance radio communication, is specified within a contact list stored within the VCMCD, then the contact name can be played. Notably, the contact name can be played using TTS technology or, as the VCMCD can perform voice dialing, the recorded user sample of the contact's name can be played to indicate the identity of the calling party or source of the incoming wireless communication.

In step 325, a determination can be made as to whether the user wishes to respond to the received wireless communication. In particular, the user can say "yes" or "no" to indicate whether the user wishes to respond to the incoming wireless communication. Notably, as mentioned, one or more "hot keys", or keys the function of which changes according to the operational state of the VCMCD can be provided. For example, controls can be provided allowing the user to answer the incoming wireless communication or send the wireless communication directly to voice mail. Still, another control can be used to ignore the incoming wireless communication and return directly to the previous function without having to wait a predetermined amount of time and hear several audio prompts before the wireless communication is sent to voice mail. Accordingly, a user can select such a key to respond to a wireless communication or simply ignore any audio prompts allowing the predetermined response time to expire such that the incoming wireless communication is ignored. Thus, if the user indicates that the incoming wireless communication is to be answered, the method can continue to step 330. If, however, the user indicates that the incoming wireless communication is to be ignored, the method can proceed to step 335. Notably, in the case where the wireless communication is not to be answered, the VCMCD can notify the user whether a message has been left. In any case, it should be appreciated that any function which can be controlled via a hardware control can be accessed also by a voice command.

Continuing with step 330, the VCMCD can switch operational modes from current mode of the VCMCD to either the short distance radio mode or the wireless telephone mode depending upon the particular wireless communication received in step 305. Accordingly, in step 340, the VCMCD can perform the functions necessary for the user to engage in short distance radio communications or a telephone call. Thus, audio received form the wireless communication can be provided to the headset unit and speech received from the user can be transmitted to the caller or individual sending short distance radio communication. In step 345, after the user has finished participating in the telephone call or the short distance radio communications, the communication session can be terminated. For example, the user can say "end call", "end communication", or can activate a control on the headset or the base unit. Notably, in the case of a wireless telephone call, the wireless telephone can automatically detect the termination of a call by the other participant. According to another embodiment of the present invention, the VCMCD can terminate an ongoing wireless communication after a predetermined time period has elapsed without any audio being received from the participant or generated by the user.

In step 350, responsive to termination of the communication session, the VCMCD can switch operational modes back to the particular mode in which the VCMCD was engaged prior to receiving the wireless communication. Accordingly, the user can resume any paused and/or discontinued activity. It should be appreciated that the method 300 illustrated in FIG. 3 is for purposes of example only. Thus, if a wireless communication is received when the VCMCD is not engaged in another function or the unit is in a sleep mode, the VCMCD still can query the user as to whether the received wireless communication is to be answered.

The VCMCD, as mentioned, can include a contact list and/or database. According to one embodiment of the present invention, the VCMCD can determine that a calling telephone number of a received call does not exist in the user's contact list. Thus, the VCMCD can prompt the user whether to store the calling number. If the user wishes to store the number, the VCMCD can query the user for the name of the contact corresponding to the calling number. According to another embodiment, the user can add and/or remove names or items from the user's contact list using simple voice commands, such as ADD or REMOVE. A file, such as a TEMPORARY file, can be utilized for the user's entering names, telephone numbers, or other data that the user may want to store on a temporary or short term basis, such as a call or message that may be expected during a short duration.

A particular name can be specified by dictating the spelling of the name letter by letter so that the letters can be speech recognized or by dictating the entire name such that the name can be recorded or speech recognized and stored for use in voice dialing the number in the future. Notably, the recorded speech or recognized text as provided to a TTS system can be used in audio prompts for notifying the user of an incoming call from the newly stored name.

The present invention can provide a variety of different functions, each of which can be accessed in a hands-free manner through one or more voice commands, or through one or more controls and operational state-dependent function controls. Accordingly, although many of the functions of the VCMCD have been described in detail, the VCMCD can provide a variety of additional functions. For example, according to one embodiment of the present invention, the VCMCD can function as an intercom. In that case, the VCMCD can be configured to operate with two or more headset units which can communicate with one another via a single base unit. Thus, the present invention can be used by motorcyclists or other active persons engaged in activities wherein the environment complicates communication between participants. Notably, the headset units can be incorporated into helmets or other varieties of protective head gear.

The intercom function of the VCMCD further can make the various functions of the VCMCD available to all users of a communicatively linked headset. For example, the VCMCD can be placed in speaker independent mode to receive voice commands from either user or can be placed in speaker dependent mode to receive voice commands from one user. Regardless, audio from the CD player and/or audio source, the AM/FM radio tuner, the short distance radio, and the wireless telephone can be made available to one or more headsets selectively. Notably, using the headsets, one or more users having access to a headset can participate in a given telephone call.

Another aspect of the present invention can include the ability to communicatively link the wireless telephone and the short distance radio such that audio received via the wireless telephone can be routed to the short distance radio and visa versa. This enables the free exchange of communications between short distance radio participants, one or more users of the VCMCD having headsets, and wireless telephone participants.

Notably, as the VCMCD includes a wireless telephone, standard telephony functions such as conference calling also can be made available. Conference call functions can be accessed via one or more voice commands. For example, responsive to a voice command such as "conference caller 1", the VCMCD can place an existing call on hold, initiate a call to a contact "caller 1", and conference caller 1 into the existing call. It should be appreciated that the particular method of establishing the conference call can vary, and that the number of conference callers to be joined to an existing call need only be limited by the telephony service. For example, responsive to a voice command such as "conference caller 1 and caller 2", the VCMCD can initiate a call to caller 1, establish the call with caller 1, place caller 1 on hold, and initiate a call to caller 2 to eventually conference caller 2 into the existing call with caller 1.

Another aspect of the present invention can provide directional services to users. In particular, as the GPS receiver can continually determine coordinates specifying the location of a user, those coordinates can be provided to the base unit processor. According to one embodiment of the present invention, the processor can provide the coordinates to a service which can be accessed via the wireless telephone. Directions to a user specified location then can be provided back to the base unit and played to the user. Alternatively, the base unit can store one or more different maps in memory allowing the base unit processor to determine a route to the user specified location and provide audible instructions as to how to follow the route.

Figure 4:
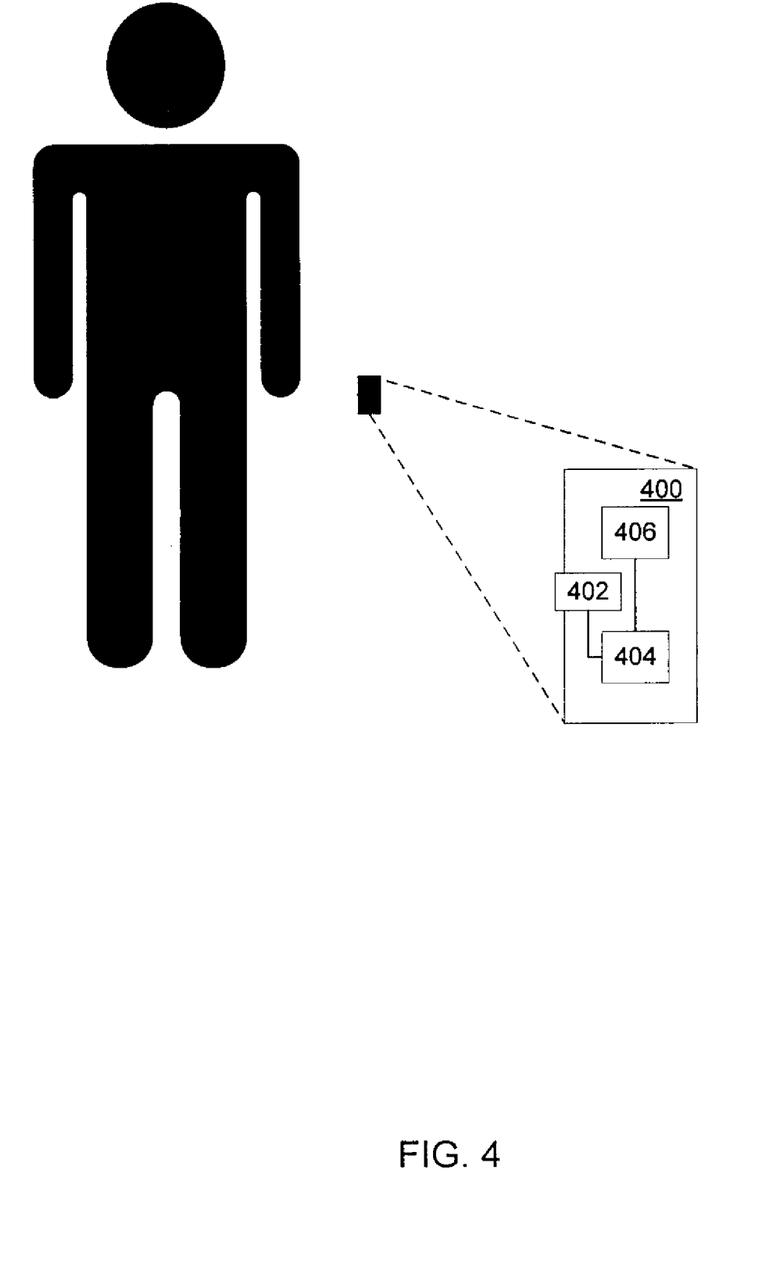
FIG. 4 is a schematic diagram illustrating a multimedia and communications control device in accordance with the inventive arrangements disclosed herein.

Yet another aspect of the invention is a multimedia and communications control device 400, schematically illustrated in FIG. 4. The device 400 illustratively includes a transducive element 402 contained within a portable housing. The device 400 further illustratively includes a processor 404 contained within the portable housing and communicatively linked to the transducive element 402. Additionally, the device 400 illustratively includes a selectively tunable transmitting circuit 406 contained within the portable housing and communicatively linked to the processor 404. The device 400 can be sized so that it can be carried or worn by a user.

Operatively, the transducive element 402, such as a microphone extending partially through the portable housing, receives spoken commands uttered by the user. The spoken commands are recognized by the speech recognition engine that executes on the processor 404. The speech recognition engine, more particularly, is configured to convert recognized voice commands into one or more electronic signals. The electronic signals selectively enable and operate each of a plurality of multimedia units, of the various types described above, each of the multimedia units being communicatively link to the device 400 by wired or wireless connections.

The selectively tunable transmitting circuit 406 transmits audio signals received from different ones of the plurality of multimedia units to a radio. More particularly, the audio signals can be transmitted by the transmitting circuit 406 via a preset, open radio channel for broadcasting the audio signals through at least one speaker contained in the radio.

The radio can be, for example, an automobile radio. Accordingly, the device 400 can be held or worn by the user in the car. Alternately, the device 400 can be removably secured within a holder positioned in the interior of the automobile to provide the user with a hands-free capability for controlling the various multimedia units while driving the automobile.

As noted, the different audio signals generated by the different multimedia units can be broadcast through the audio system speakers of the automobile. In this manner, depending on the particular multimedia unit activated, different types of audio signals can be heard within the interior of the automobile by the driver as well as one or more passengers. As described above, the various audio signals can include, for example, audio signals generated by an MP-3 device, cellular telephone audio signals, short-distance radio signals, and/or the audio playback signals of an electronic Memo Pad.

One of the multimedia units, more particularly, can be a wireless telephone. According to a particular embodiment, the processor disables an active one of the plurality of multimedia units in response to the wireless telephone receiving a telephone call. The processor can disable an active one of the plurality of multimedia units by lowering an audio volume of the active multimedia unit. The processor, additionally or alternatively, can disable an active one of the plurality of multimedia units by pausing operation of the active multimedia unit. Moreover, when the telephone call terminates, the processor can re-enable the active one of the plurality of multimedia units.

Generally, the processor 404 can be configured to communicate the wireless telephone call received by the wireless telephone through the radio. The processor 404 can be further configured to effect conference calls through the wireless telephone is response to one or more of the plurality of spoken commands.

Also generally, but especially in the context of the device being used within an automobile, the device 400 can be configured to communicatively link to a headset unit. When the headset unit is communicatively linked to the device 400, the processor 404 can prevent the broadcast of audio signals via the radio, and instead communicate the audio signals to the user through the headset unit. This affords the user a degree of privacy when the user is near other persons, such as when the user is in an automobile occupied by more than one person.

As will be readily understood by one of ordinary skill in the art, the voice recognition engine that executes on the processor 404 can be configured for voice-recognition "training." Specifically, the voice recognition engine can be trained, based on a plurality of voice samples, to recognize and respond to spoken commands of the user. Thus, an additional feature of the device 400 can include a manual user switch that allows at least one additional user to train the voice recognition engine to recognize and respond to spoken commands of the at least one additional user. Optionally, the device 400 can further include a pass-code protection interface for preventing operation of the manual user switch unless a pre-selected pass-code is entered via the interface, as will also be readily understood by one of ordinary skill.

Figure 5:
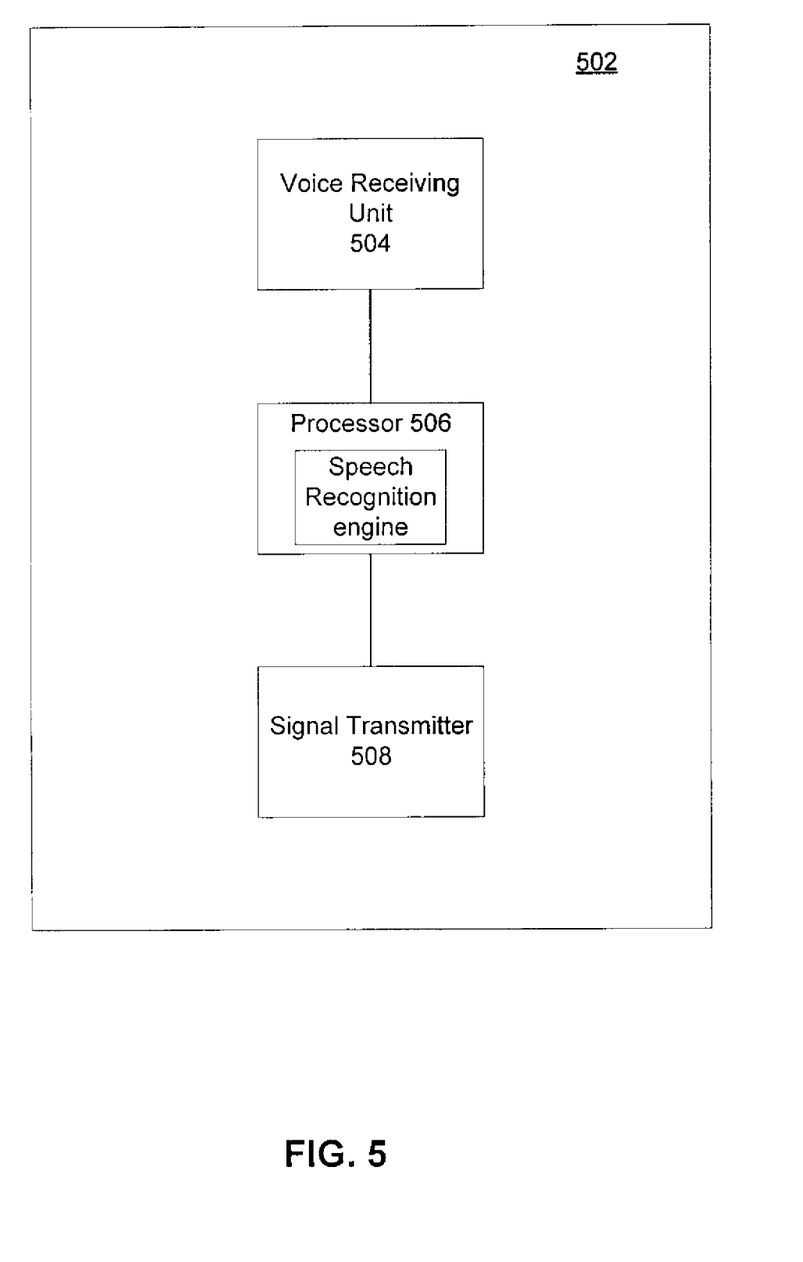
FIG. 5 is a schematic diagram illustrating a speech-based appliance control device in accordance with the invention arrangements disclosed herein.

FIG. 5 schematically illustrates a voice-based appliance control device 502, according to still another aspect of the invention. The appliance control device 502 as described herein can be used in a home or office environment to control through voice commands different operations of various units. Such units include a home or office premises-security unit, for example. Another voice-controlled unit can be, for example, an entertainment unit located within a home or office. Still other exemplary voice-controlled units can be a conventional or microwave oven, a television, and/or a CD or DVD player. Yet another example of an exemplary unit that can be voice-controlled, according to the invention, is an indoor and/or outdoor light or lighting system.

As explained herein, the device 502 can generate radio frequency (RF) signals, infrared frequency (IR) signals, and or Bluetooth signals, as described above. The signals, more particularly, act as control signals for controlling various types of home and/or office appliances and devices. For example, the control signals can turn on and off lights, as well as adjust lighting intensity. The control signals can be used to turn on and off a home or office air conditioning unit as well as set the thermostat of such a system, for example. For example, the control signals, likewise, can turn on and off a home entertainment system, select a channel or disk to be played through the system, and further control system parameters such a volume. An exemplary listing of further voice commands is included in the Appendix referred to above.

The device 502 illustratively includes a voice receiving unit 504 contained within a portable housing. The device 502 further illustratively includes a processor 506 communicatively linked to the voice receiving unit 504. Additionally, the device includes a signal transmitter 508 communicatively linked to the processor 506.

Operatively, the voice receiving unit 504 receives different spoken commands uttered by a user. The processor 506 executes a speech recognition engine that recognizes and converts each of the spoken commands into one or more corresponding electronic control signal. The electronic control signals are then wirelessly conveyed by the signal transmitter 508 to selectively enable and operate various appliances and/or located inside and/or outside a home, or within an office.

Figure 6:
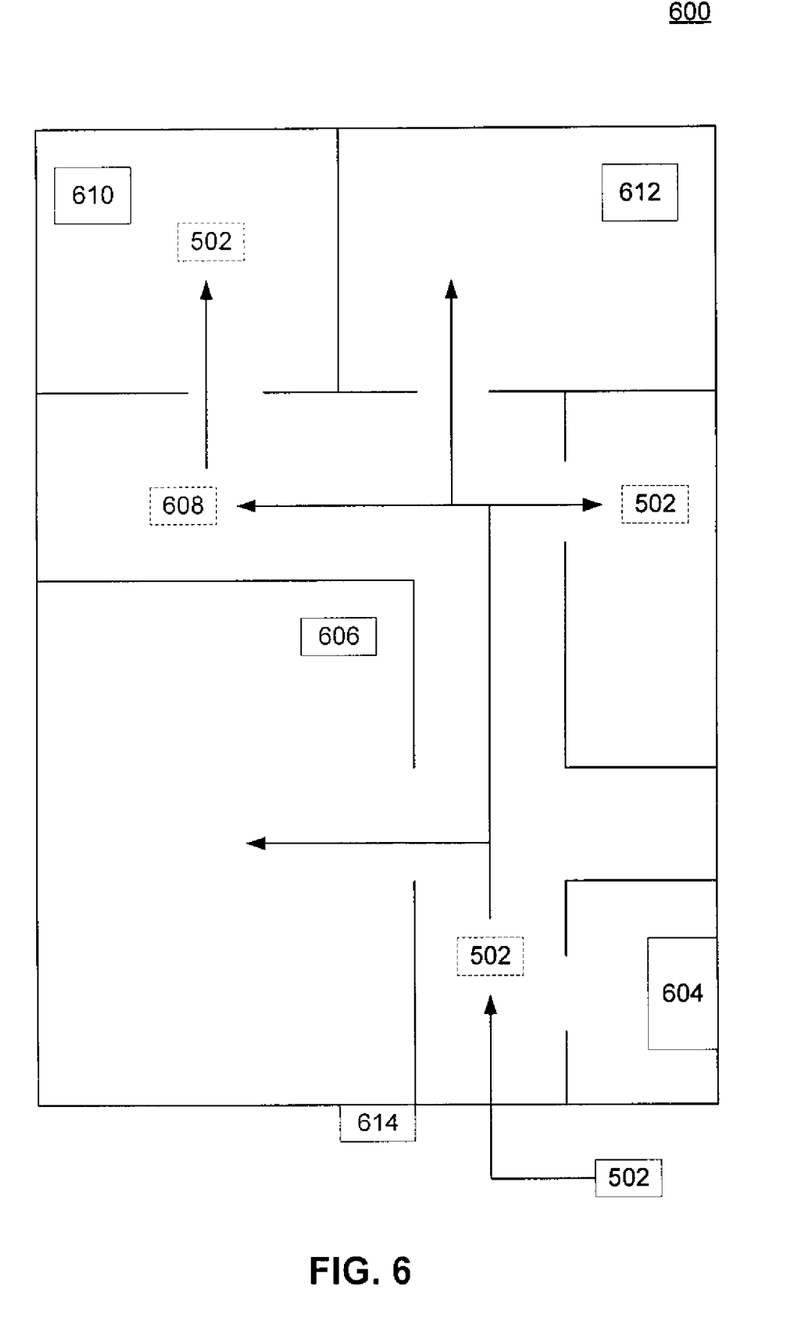
FIG. 6 is a schematic diagram illustrating exterior and interior portions of a home environment in which the appliance control device of FIG. 1 can be used is accordance with the inventive arrangements disclosed herein.

Referring additionally to FIG. 6, the device 502 can be employed in a home environment 600 to selectively control a plurality of different appliances 604-614 while the user is yet outside the home, inside the home, and/or moving from room to room. In order to control different devices from outside the home or when in a different room than the one in which the appliance is located, one or more RF, IR, or Bluetooth repeaters (not explicitly shown) can be deployed within the home environment 600 or in an office. The device 502, accordingly, can transmit wireless command signals beyond a line of sight and to more than one room. According to one embodiment, the device 502 activates and controls electrical outlets, switches, lamps, entertainment devices, and other units all having a signal-responsive interface. More particularly, the device-unit interaction can utilize X-10 and/or ZWave technologies, as will be readily understood by one of ordinary skill in the art.

According to still another aspect of the invention, the device 502 can be pre-programmed by voice commands through the voice receiving unit 504. Alternatively or additionally, the device 502 can be programmed, for example, using a computing device, such as a personal computer (PC) or other such computing device. Moreover, the device 502 can be programmed to recognize and respond to codes that identify the brand of an appliance and/or a particular model. Once programmed, the device 502 can be used, as described above, to control various home and/or office systems or devices via voice-based commands.

The speech recognition engine that executes on the processor 506, according to another aspect of the invention, can be switched between a speaker-independent operational mode and a speaker-dependent operational mode responsive to a user spoken utterance. Additionally, the voice recognition engine can be configured for training using a plurality of voice samples to recognize and respond to a particular user's spoken commands. Accordingly, the device 502 can further include a manual user switch that allows at least one additional user to train the voice recognition engine to recognize and respond to spoken commands of the at least one additional user. The device 502, moreover, can further include a pass-code protection interface for preventing operation of the manual user switch unless a pre-selected pass-code is entered via the interface.

Figure 7:
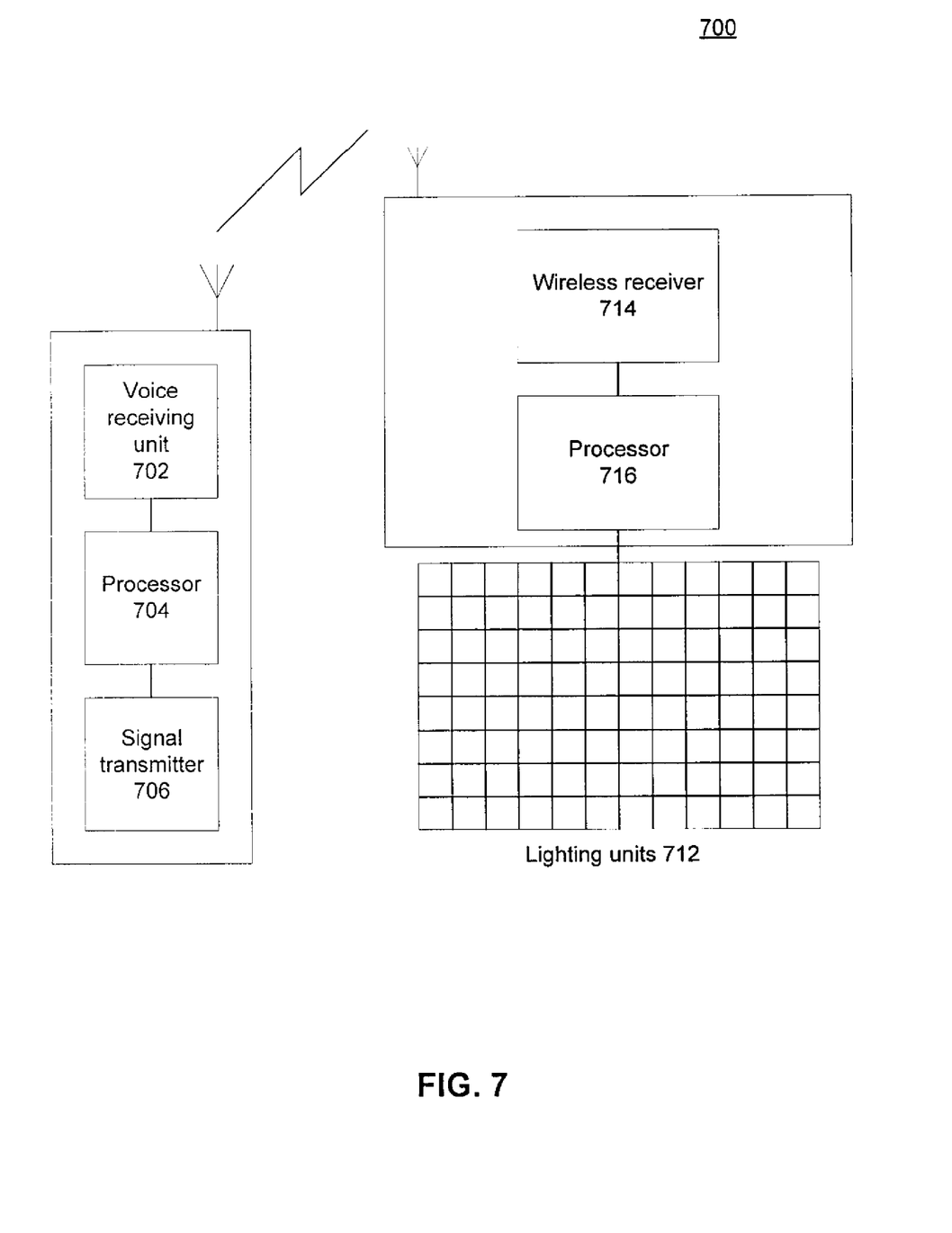
FIG. 7, a light-based communications system 700, according to still another aspect of the invention

Referring now to FIG. 7, a light-based communications system 700, according to still another aspect of the invention, is schematically illustrated. The system 700 illustratively includes a voice receiving unit 702 contained within a portable housing for receiving a plurality spoken commands uttered by a user. The system 700 further illustratively includes a processor 704 also contained within the housing and connected to the voice receiving unit 702. A speech recognition engine executes on the processor 704 to recognize and convert each of the spoken commands into corresponding electronic control signals. Additionally, the system 700 includes a signal transmitter 706 also contained within the portable housing for wirelessly transmitting the electronic control signals.

The system 700 further illustratively includes multiple, individually activated lighting units, defining a planar light array 712. The system also includes a wireless receiver 714 for wirelessly receiving the electronic control signals, and a processor 716 for individually activating selected ones of the multiple lighting units in response to the received electronic control signals such that, when activated, the selected lighting units spell out a written communication message.

The lighting units forming the planar light array 712 can comprise, for example, a liquid crystal display (LCD) that spells out individual letters, words, and/or numbers. The light array 712 can be positioned, for example, in home or office window, or in the window of an automobile. Used in the window of an automobile, for example, the system 700 allows a user to convey messages to individuals in other vehicles and/or to pedestrians. Similarly, a home owner can display and change messages on the light array 712, when the array is affixed to a door, positioned inside a display window, or placed at various locations with a business establishment.

Although only a single light array 712 is shown in the figure, it will be readily apparent that more than one such light array can be utilized. Moreover, each of a plurality of such light arrays can be selectively controlled using a single wireless receiver 714 communicatively linked to a processor 716. Alternatively, each such light array can be controlled by its own corresponding wireless receiver 714 and processor 716. A light array 712, moreover, can be positioned remote from the receiver 714 and processor 716 which control the light array.

In the context of a retail store or other business establishment, the system 700 would enable a user to walk through the establishment and, by uttering voice commands corresponding to different light arrays, activate and/or change individual messages on each of the different light arrays. The system 700 enables this without the user having to do more than simply speaking distinct commands into the voice receiving unit 702; that is, without having to manually manipulate any of the different light arrays.

Those skilled in the art will recognize that the invention disclosed herein can be embodied in a variety of different physical arrangements. Accordingly, depending upon the size of the various multimedia units to be included within the present invention, the base unit can be combined with the headset unit. In particular, if larger multimedia units are excluded in favor of more compact multimedia units, for example where the CD player is excluded in favor of an MP3 player, the VCMCD can be embodied as a single headset device capable of performing the various functions disclosed herein.

The present invention can be realized in a combination of hardware and software. Any kind of computer system or other apparatus adapted for carrying out the methods described herein is suited. Aspects of the present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

Appendix

Exemplary voice commands for controlling various operational parameters of the voice controlled multimedia and communication device (VCMCD) as disclosed herein are illustrated below. Notably, the various voice commands listed herein can be amended to include a code, that if said in combination with the listed voice command, can cause the VCMCD to process the received speech using a speaker independent recognition model rather than a user specific speech recognition model, and vice versa.

1. VCMCD (General).
 a. DEVICE (ON/OFF). Turns entire VCMCD on or off.
 b. DEVICE ON (code). Turns entire device on in a universal voice mode if user programmed code is specified in combination with DEVICE ON command.
 c. VOLUME (UP/DOWN). Raises or lowers volume of presently enabled multimedia unit.
 d. STANDBY. The designated feature or the feature currently operating can be placed on standby.
2. AM/FM Radio Tuner.
 a. RADIO (ON/OFF). Enables or disables AM/FM radio tuner.
 b. GO TO (AM/FM). Causes AM/FM radio tuner to switch to specified band.
 c. GO TO X PLAY. Causes AM/FM radio tuner to change specified frequency on current band and play audio from the AM/FM radio tuner.
 d. SCROLL (UP/DOWN). Causes AM/FM radio tuner to search for a next higher or lower frequency which is clearly received.
 e. SCAN (UP/DOWN). Causes AM/FM radio tuner to scan frequencies up or down until stopped by user.
 f. STOP. Causes AM/FM radio tuner to stop scanning frequencies and play the station to which the AM/FM radio tuner is presently tuned.
3. Compact Disc (CD) Player.
 a. CD (ON/OFF). Enables or disables CD player.
 b. PLAY. Play disc in CD player beginning at first track.
 c. PLAY TRAC X. Plays specified track of CD in CD player.
 d. REPEAT DISC. Plays CD continuously until stopped by user.
 e. REPEAT TRACK. Plays current track until stopped by user.
 f. STOP. Stops playing current track.
4. Short Distance Radio.
 a. COMMUNICATOR (ON/OFF). Enables or disables short distance radio.
 b. GO TO CHANNEL X. Switches short distance radio to designated channel.
 c. SCROLL (UP/DOWN). Causes short distance radio to scroll up or down a single channel.
 d. SCAN (UP/DOWN). Causes short distance radio to scan channels up or down until stopped by user.
 e. STOP. If received during SCAN operation, causes short distance radio to stop scanning.
5. Memo Pad.
 a. MEMO (ON/OFF). Enables or disables the memo pad function.
 b. (START/STOP). Begins or terminates recording when in memo pad function.
 c. SEND TO X. Causes voice memo to be speech recognized and text to be sent to designated contact or causes audio recording to be played after connecting with another party over a wireless communication link.
6. Wireless Telephone.
 a. PHONE (ON/OFF). Enable or disable wireless telephone.
 b. SAVE CONTACT. Saves current number, i.e. of received call, in address list along with recorded name of contact or text name as determined by speech recognition engine through character recognition.
7. GPS Receiver/Finder.
 a. LOCATOR (ON/OFF). Enable or disable GPS receiver.
 b. DIRECTIONS TO X. Causes GPS receiver to note current position and initiate audio directions to user specified location.

c. SOS. Sends wireless communication, i.e. wireless telephone call to specified destination, short distance radio communication, or transponder signal. Can specify GPS determined coordinates.

8. Home Command Mode.

a. LIGHT (ON/OFF). Activate a home or office lighting fixture.

b. BRIGHTNESS (INCREASE/DECREASE). Control intensity of lighting.

c. AIR CONDITIONING (HEAT/COOL). Activate air conditioning unit.

d. TEMPERATURE (RAISE/LOWER). Control home or office temperature.

e. TV [device] (ON/OFF). Activate television or other media device.

f. CHANGE CHANNEL (GO TO CHANNEL [NUMBER]). Set channel of television or other media unit.

e. SAVE ([GO TO] [Number] AND SAVE). Save a channel selection g. VOLUME (INCREASE/DECREASE). Control volume.

I claim:

1. A method for operating a communications device, comprising:
receiving a plurality of spoken commands uttered by a user, the plurality of spoken commands comprising a custom written communication message to be displayed;
executing a speech recognition engine to recognize and convert each of the spoken commands into corresponding electronic signals that selectively enable and operatively control each of a plurality of multimedia units and at least one light array, wherein the electronic signals are configured to cause multiple light units of the light array to be selectively activated and display the custom written communication message; and
transmitting audio signals received from different ones of the plurality of multimedia units to a radio via a preset open radio channel for broadcasting the audio signals through at least one speaker connected to the radio.

2. The method of claim 1, wherein step of executing further comprises switching the speech recognition engine between a speaker-independent operational mode and a speaker-dependent operational mode responsive to a user spoken utterance.

3. The method of claim 1, wherein the step of executing further comprises disabling an active one of the plurality of multimedia units responsive to activating another one of the plurality of multimedia units.

4. The method of claim 3, wherein the disabling comprises disabling the active one of the plurality of multimedia units by lowering an audio volume of the active one of the plurality of multimedia units.

5. The method of claim 3, wherein the disabling comprises disabling the active one of the plurality of multimedia units by pausing operation of the active one of the plurality of multimedia units.

6. The method of claim 3, wherein the step of executing further comprises re-enabling the active one of the plurality of multimedia units responsive to terminating use of the another one of the plurality of multimedia units.

7. The method of claim 3, wherein the active one of the multimedia units is a wireless telephone, and further comprising communicating a wireless telephone call received by the wireless telephone through the radio.

8. The method of claim 7, further comprising effecting conference calls through the wireless telephone in response to one or more of the plurality of spoken commands.

9. The method of claim 1, wherein the device is further configured to communicatively link to a headset unit, and further comprising preventing the broadcast of audio signals via the radio and communicating the audio signals to the user through the headset unit.

10. The method of claim 1, wherein the speech recognition engine is configured for training to recognize and respond to spoken commands of the user, and further comprising allowing at least one additional user to train the voice recognition engine to recognize and respond to spoken commands of the at least one additional user responsive to a manual switch setting of the device.

11. A non-transitory computer readable medium storing instructions for causing a computer to operate a communications device, the instructions comprising:
receiving a plurality of spoken commands uttered by a user, the plurality of spoken commands comprising a custom written communication message to be displayed;
executing a speech recognition engine to recognize and convert each of the spoken commands into corresponding electronic signals that selectively enable and operatively control each of a plurality of multimedia units and at least one light array, wherein the electronic signals are configured to cause multiple light units of the light array to be selectively activated and display the custom written communication message; and
transmitting audio signals received from different ones of the plurality of multimedia units to a radio via a preset open radio channel for broadcasting the audio signals through at least one speaker connected to the radio.

12. The non-transitory computer readable medium of claim 11, wherein step of executing further comprises switching the speech recognition engine between a speaker-independent operational mode and a speaker-dependent operational mode responsive to a user spoken utterance.

13. The non-transitory computer readable medium of claim 11, wherein the step of executing further comprises disabling an active one of the plurality of multimedia units responsive to activating another one of the plurality of multimedia units.

14. The non-transitory computer readable medium of claim 13, wherein the disabling comprises disabling the active one of the plurality of multimedia units by lowering an audio volume of the active one of the plurality of multimedia units.

15. The non-transitory computer readable medium of claim 13, wherein the disabling comprises disabling the active one of the plurality of multimedia units by pausing operation of the active one of the plurality of multimedia units.

16. The non-transitory computer readable medium of claim 13, wherein the step of executing further comprises re-enabling the active one of the plurality of multimedia units responsive to terminating use of the another one of the plurality of multimedia units.

17. The non-transitory computer readable medium of claim 13, wherein the active one of the multimedia units is a wireless telephone, and further comprising communicating a wireless telephone call received by the wireless telephone through the radio.

18. The non-transitory computer readable medium of claim 17, further comprising effecting conference calls through the wireless telephone in response to one or more of the plurality of spoken commands.

19. The non-transitory computer readable medium of claim 11, wherein the device is further configured to communicatively link to a headset unit, and further comprising preventing the broadcast of audio signals via the radio and communicating the audio signals to the user through the headset unit.

20. The non-transitory computer readable medium of claim 11, wherein the speech recognition engine is configured for training to recognize and respond to spoken commands of the user, and further comprising allowing at least one additional user to train the voice recognition engine to recognize and respond to spoken commands of the at least one additional user responsive to a manual switch setting of the device.

* * * * *